J. McMULLEN.
MOUNT FOR EYEGLASSES.
APPLICATION FILED FEB. 19, 1912.
1,065,314.
Patented June 17, 1913.
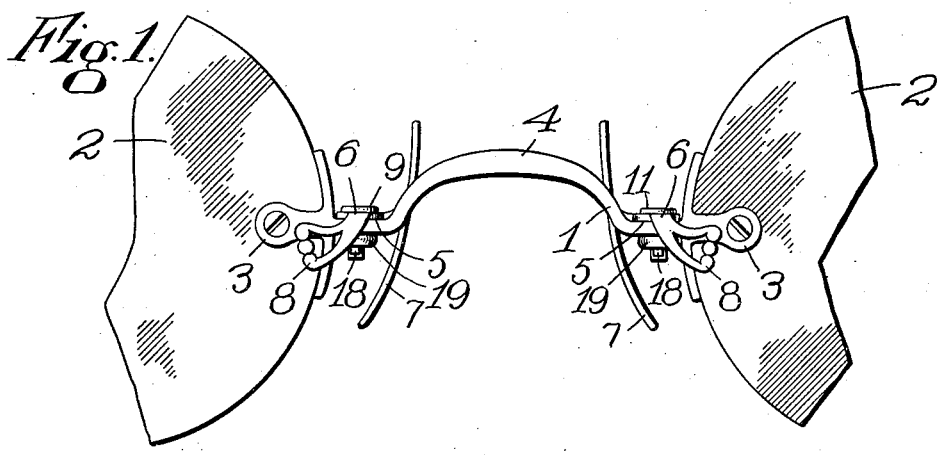
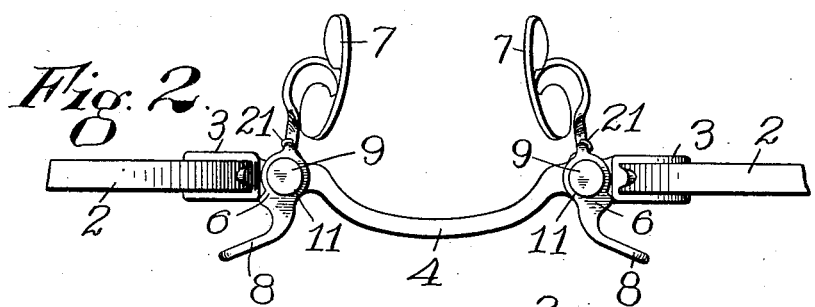
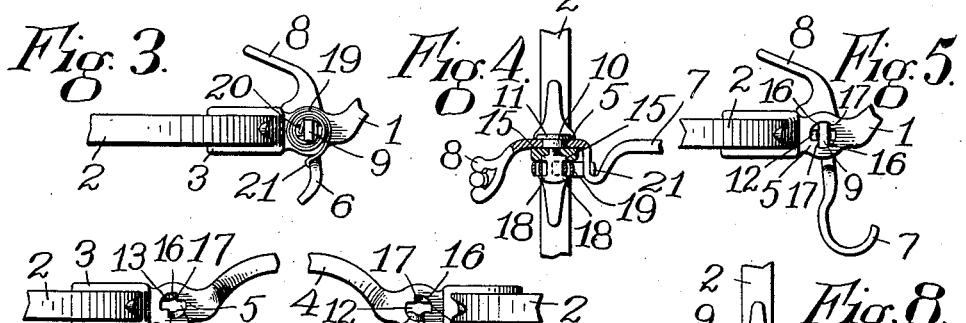
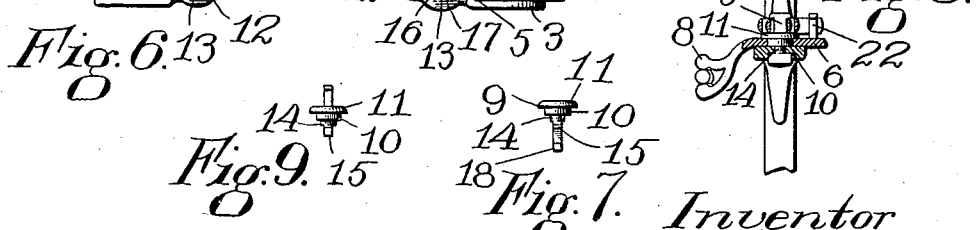
Witnesses
B. D. Holman.
Penelope Comberback.
Inventor
John McMullen.
By Rufus B. Fowler
Attorney

UNITED STATES PATENT OFFICE.

JOHN McMULLEN, OF ATTLEBORO, MASSACHUSETTS.

MOUNT FOR EYEGLASSES.

1,065,314.  Specification of Letters Patent.  Patented June 17, 1913.

Application filed February 19, 1912. Serial No. 678,682.

*To all whom it may concern:*

Be it known that I, JOHN MCMULLEN, residing at Attleboro, in the county of Bristol and Commonwealth of Massachusetts, have invented a new and useful Improvement Relating to a Mount for Eyeglasses, of which the following is a specification, accompanied by drawings forming a part of the same.

My invention relates to a mount for an eyeglass and especially to that class provided with nose guards pivotally connected to the bridge and having finger levers by which the nose guards are separated against the tension of a spring in applying the eyeglass to the nose.

The objects of my invention are to simplify the construction of this class of eyeglass mounts; to avoid the use of screws which are liable to become loosened by continued use; to facilitate the assembling of the several parts; to increase the bearing surfaces of the movable parts; to enable any individual part to be easily removed or replaced; to render the structure more rigid, and secure greater resistance to any deforming strains incident to its use, and also to improve its appearance. These objects, among others, I secure by the construction and arrangement of parts as hereinafter described, the novel features being pointed out in the annexed claims.

Referring to the drawings, Figure 1 is a front view of an eyeglass mount embodying my invention, a portion only of the lenses being shown. Fig. 2 is a top view of the same. Fig. 3 is a bottom view of one end of the bridge with the pivoted nose guard connected thereto. Fig. 4 is a sectional view on the plane of the pivotal connection of the nose guard and bridge. Fig. 5 represents a bottom view, as shown in Fig. 3, but with the spring for actuating the nose guard removed. Fig. 6 is a bottom view of the bridge showing the construction at the opposite ends of the bridge for attaching pivotal nose guards thereto. Fig. 7 is a detached view of the pivotal stud on which the nose guard is mounted. Fig. 8 is a sectional view on the plane of the pivotal connection of the nose guard and bridge, showing a modification in the construction of the pivotal pin and the application of a spring thereto. Fig. 9 is a detached view of the modified form of the pivotal pin shown in Fig. 8.

Similar reference letters and figures refer to similar parts in the different views.

Referring to the drawings, 1 denotes the bridge of an eyeglass mount, and 2, 2, denote the lenses supported at the opposite ends of the bridge. In the present instance I have represented the lenses attached to the bridge by straps 3, 3, instead of eye wires. The type of eyeglass shown is known as "rimless". Between the arched section 4 of the bridge and the straps 3, the bridge is flattened and expanded in width to form a broad seat 5 for a nose guard lever 6. The nose guard levers 6 rest upon the upper surfaces of the seat 5 at opposite ends of the bridge. The inner ends of the levers 6 carry nose guards 7, and the outer ends 8 of the levers are adapted to be compressed or brought toward each other by hand in order to rock the levers 6 and separate the nose guards 7 in applying them to the nose. The nose guard lever 6 is pivoted upon a stud 9 having a large cylindrical surface 10 on which the lever turns and a flanged head 11 extending over the top of the nose guard lever, thereby securely holding it in place while it is free to rock upon and be supported by the broad seat 5.

The stud 9 is securely held in the bridge as follows:—An elongated hole 12 is made in the bridge having its central portion preferably inclosed by curved sides 13, 13, concentric with the seat 5. The stud 9 immediately below the cylindrical surface 10 is also cylindrical at 14, but of less diameter, and is adapted to fit in and be capable of turning between the curved sides 13, 13, of the elongated hole in the bridge. Below the cylindrical portion 14 the stud is flattened and extended in width forming shoulders 15, 15. The lever 6 is applied to the cylindrical surface 10 and the stud 9 is inserted through the hole 12 and turned one quarter revolution, bringing the shoulders 15, 15, against the under side of the seat 5. In order to render the stud 9 more firm in its seat the under side of the seat is recessed, as shown at 16, 16, Fig. 6, forming shoulders 17, 17, on opposite sides of the elongated hole 12. The shoulders 17, 17, serve as stops to limit the rotation of the stud to one quarter revolution. The bottoms of the recesses 16, 16, are preferably cam shaped or inclined, so that the passage of the shoulders 15, 15, over them will draw the cylindrical bearing surface firmly against the upper surface of the seat. The stud 9 extends some distance below the seat 5 and at its lower end it is provided with shoulders 18, 18. A torsional spring 19 is applied to the extended lower end of the stud, having one end provided with a hook 20 which engages the flattened sides of the stud. The opposite end of the spring is connected to the nose guard lever 6 at 21.

The tension of the springs on opposite ends of the bridge is so applied to the nose guard levers 6 that their tension will tend to rock the levers 6 on their pivotal studs to carry the nose guards against the nose in the manner common to springs usually applied to nose guard levers.

In Fig. 8 I have shown a slight modification in the construction of the pivotal stud which consists in forming an extension to hold the torsional spring on the upper end of the stud instead of the lower end, as shown in Fig. 4, the upward extension 22 being similar to the lower extension shown in Fig. 4, except that it is placed above the flanged head of the stud.

In Figs. 8 and 9, the various numerals are primed to correspond with the same parts in the other figures of the drawing.

The pivotal stud comprises in either of the forms shown a flanged head on which the nose guard lever rocks, a shank of less diameter than the head, forming a shoulder which rests upon the upper surface of the bridge, a radial projection or shoulder adapted, by a rotative movement of the stud, to engage the under side of the bridge, and an extension to which one end of the spring is connected provided at its end with projections or shoulders overlapping the spring. Upon the under side of the bridge I provide a stop to limit the rotative movement of the stud, consisting in the present instance of the shoulders 17, 17, and in order to draw the head of the stud firmly against the upper side of the bridge, cam surfaces are formed on the under side of the bridge, over which the radial projections or shoulders 15, 15 pass as the stud is rotated. These elements may obviously be embodied in other forms than those shown in the accompanying drawings, therefore I do not wish to confine myself to the specific embodiment illustrated.

The radial projections 15, 15, are held against the stop shoulders 17, 17 by the tension of the springs 19 as applied to the pivotal studs. For this purpose the shoulders 17, 17 at the opposite ends of the bridge are reversed, or made right and left, as shown in Fig. 6. The tension of the springs therefore tends to prevent the loosening of the pivotal studs.

In the accompanying drawings I have shown a desirable method of connecting the end of the spring with the nose guard lever, when the spring is placed in what I consider a preferable position, viz., beneath the bridge. As shown in Fig. 4 the nose guard lever is bent downwardly between the nose guard and the bridge and adjacent to the bridge, as represented at Fig. 4, thereby bringing the lever into the plane of the spring, and to the downwardly bent section I connect the outer end of the torsional spring. The lever is then bent upwardly to bring its attachment to the nose guard into, or preferably slightly above the plane of the pivotal connection of the lever with the bridge. The downward and upward bends of the lever form a loop which may be varied in curvature to adjust the position of the nose guard.

I claim,

1. In an eyeglass mount, the combination with a bridge and a pivoted nose guard lever supported thereby, of a pivotal stud for said lever having a flanged head provided with a bearing surface for said lever, a shank passing through a hole in the bridge and having a shoulder adapted to be rotatively brought into engagement with cam surfaces on the bridge.

2. In an eyeglass mount, a bridge, a nose guard lever, a pivotal stud for said lever provided with a cylindrical head forming a bearing for said lever, a shank rotatable in said bridge, a radial projection adapted to engage the surface of the bridge, and a stop to limit the rotation of the stud.

3. In an eyeglass mount, a bridge having an elongated hole, a pivotal stud having a shank passing through said hole, means adapted by a rotative movement imparted to said stud to hold the stud from endwise movement, and a nose guard lever pivotally held on said stud.

4. In an eyeglass mount, a bridge having a hole therethrough, a pivotal stud provided with a shoulder bearing against one side of the bridge, a shank passing through the hole in the bridge and having a radial projection adapted by a rotative movement of said stud to be brought into engagement with the opposite side of said bridge, and a nose guard lever pivoted on said stud.

5. In an eyeglass mount, a bridge having a hole therethrough, a pivotal stud held in said hole provided with a cylindrical surface forming a bearing for a nose guard lever, a shank passing through the hole in the bridge, means carried by the stud to hold it from endwise movement, and means carried by the bridge to hold the stud from rotative movement in one direction, and a nose guard lever pivoted on said stud.

6. In an eyeglass mount, a bridge having a hole therethrough, a pivotal stud having a shank held in said hole, a radial projection on said shank engaging a recess in said bridge, a stop to limit the rotative movement of said stud, and a nose guard lever pivoted on said stud.

7. In an eyeglass mount, a bridge having a hole therethrough, a pivotal stud held therein, cams adapted by a rotative movement of the stud to hold the stud from longitudinal movement, a nose guard lever pivoted on said stud, a longitudinal extension on said stud, and a torsional spring carried by said extension and connected with said nose guard lever.

8. In an eyeglass mount, a bridge having a hole therethrough, a pivotal stud having a shoulder bearing against one side of said bridge, a cam surface on the opposite side of said bridge, a shank passing through said hole, a radial projection on said stud engaging said cam surface to draw said shoulder against the bridge, and a nose guard lever pivoted on said stud.

9. In an eyeglass mount, a bridge having a hole therethrough, a stud held in said hole, provided with a flattened section projecting beyond the surface of the bridge, a torsional spring having one end connected with said flattened section, a nose guard lever pivoted on said stud and connected with the opposite end of said spring, and a projection on the end of said flattened section overlapping said spring.

10. In an eyeglass mount, a bridge having a hole therethrough, a pivotal stud held in said hole and capable of a rotative movement, a stop on the bridge to limit the rotative movement of said stud in one direction, a nose guard lever pivotally mounted on said stud, and a torsional spring with one end connected with said lever and its opposite end connected with said stud, with the tension of said spring applied to hold said stud against said stop.

JOHN McMULLEN.

Witnesses:
PENELOPE COMBERBACH,
NELLIE WHALEN.

---

Copies of this patent may be obtained for five cents each, by addressing the "Commissioner of Patents, Washington, D. C."